Figure 1:
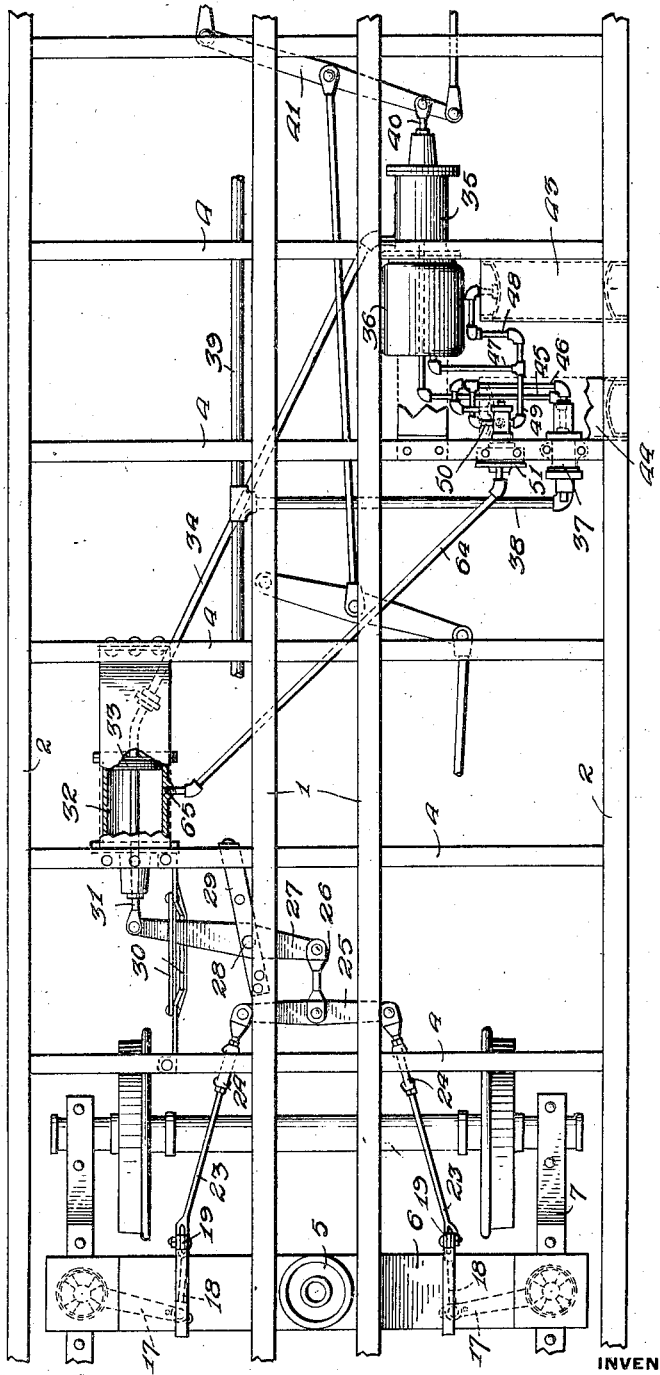

H. H. FORNEY & O. B. SCHOENKY.
LOAD REGULATED BRAKE MECHANISM.
APPLICATION FILED NOV. 17, 1910.

1,000,593.

Patented Aug. 15, 1911.

3 SHEETS—SHEET 1.

WITNESSES

INVENTORS

H. H. FORNEY & O. B. SCHOENKY.
LOAD REGULATED BRAKE MECHANISM.
APPLICATION FILED NOV. 17, 1910.
1,000,593.
Patented Aug. 15, 1911.
3 SHEETS—SHEET 2.
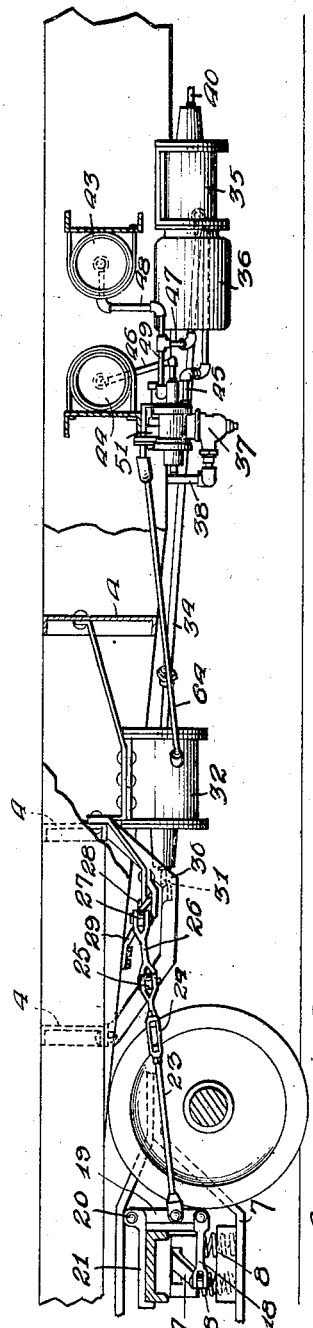

H. H. FORNEY & O. B. SCHOENKY.
LOAD REGULATED BRAKE MECHANISM.
APPLICATION FILED NOV. 17, 1910.
1,000,593.
Patented Aug. 15, 1911.
3 SHEETS—SHEET 3.
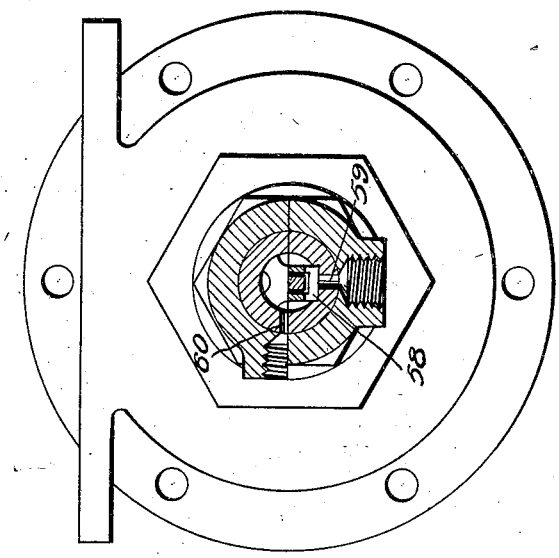
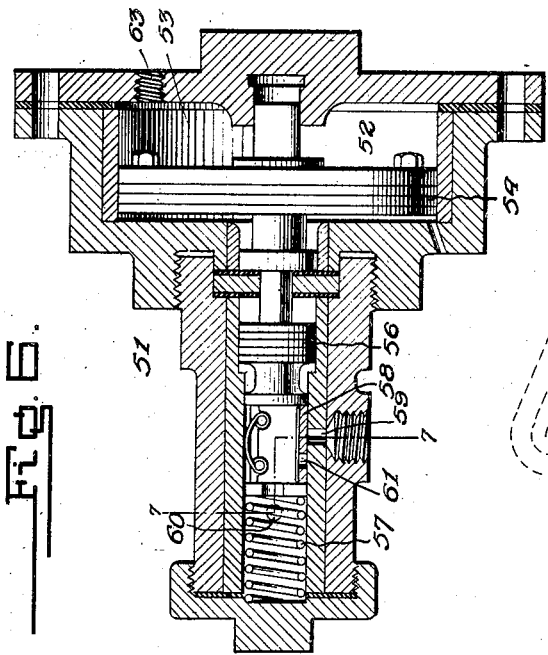
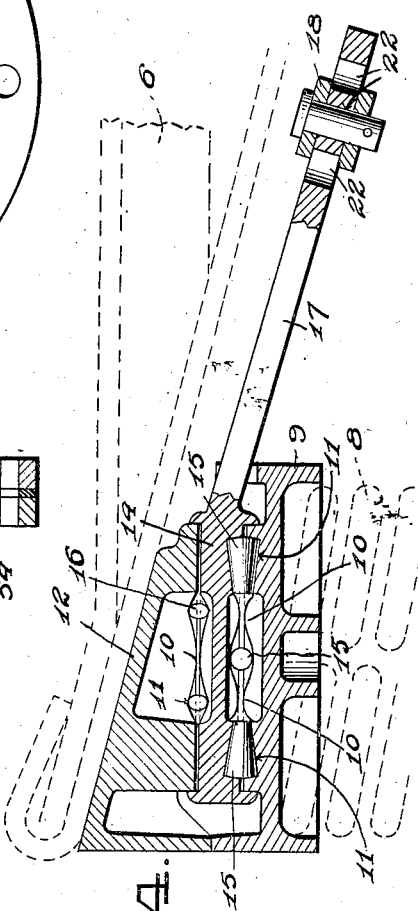

UNITED STATES PATENT OFFICE.

HENRY H. FORNEY, OF SAN FRANCISCO, AND OTTO B. SCHOENKY, OF EASTON, CALIFORNIA.

LOAD-REGULATED BRAKE MECHANISM.

1,000,593.  Specification of Letters Patent.  Patented Aug. 15, 1911.

Application filed November 17, 1910. Serial No. 592,852.

*To all whom it may concern:*

Be it known that we, HENRY H. FORNEY, of San Francisco, county of San Francisco, and OTTO B. SCHOENKY, of Easton, in the county of San Mateo, State of California, have invented a new and useful Improvement in Load-Regulated Brake Mechanism, of which the following is a specification.

This invention relates to fluid pressure brakes, and more particularly to means for regulating or graduating the braking power in proportion to the load or weight of the car.

The object of the invention is to automatically increase the braking power on loaded cars and reduce the same on light or unloaded cars, so as to give uniform braking effects, maintain uniform auxiliary reservoir pressure throughout the train, insure uniform release of the brakes, prevent or at least reduce the tendency to skid and flatten the wheels, and also permit the efficient handling of very long trains, and particularly when running down grade where a high braking percentage is required and without interfering with the flexibility and ordinary operation of the brakes.

The present invention has the same general object in view as that of our Patent No. 920,310, granted May 4, 1909, with the further advantages that it largely prevents loss of air, permits equalizing auxiliary reservoir pressure with train pipe pressure so as to insure uniform release of the brakes throughout the train, and avoids or largely decreases friction in the mechanism.

Generally speaking, the invention comprises the combination with the usual brake cylinder, of an auxiliary brake cylinder, a plurality of auxiliary reservoirs, a control valve actuated from brake cylinder pressure and itself controlled according to the load or weight of the car and serving to regulate the brake cylinder pressure according to the load of the car, and cam disk means for exerting a lifting action on the body of the car and which includes rollers to avoid friction; all as hereinafter described and claimed.

In the accompanying drawings Figure 1 is a diagrammatic view showing in plan the under frame of a car with the improved brake mechanism applied thereto, parts being shown in horizontal section; Fig. 2 is a diagrammatic view showing the parts partly in side elevation and partly in vertical section; Fig. 3 is a plan view of the cam mechanism for exerting a lifting action on the car body; Fig. 4 is a vertical section through the same; Fig. 5 is a perspective view of the cam disk; Fig. 6 is a vertical longitudinal section through the special control valve; and Fig. 7 is a vertical transverse section of the same on the line 7—7, Fig. 6.

The invention is applicable to a railway car of any type or construction. The drawings show a typical design of metal under frame having center sills 1, side sills 2, body bolsters (not shown), and transverse ties or transoms 4. This under frame is designed to be supported by the usual center bearing plate 5 upon truck bolster 6. The truck bolster at its end is supported from the truck side frames 7 by the usual springs 8, provided with spring caps 9, as is usual.

With the present invention the truck bolster does not rest directly upon the spring caps, but there is interposed between the same the special cam mechanism for exerting a lifting action on the car body for the purpose of regulating the braking power according to the weight of the car. In the construction shown each spring cap has its upper surface provided with an annular cam face presenting a plurality of elevated portions 10 and a corresponding number of depressed portions 11, there preferably being 4 of each arranged at angles of 90 degrees from each other, as shown. Secured to the lower face of the truck bolster are cam plates 12 having annular cam faces corresponding to the cam faces on the spring caps, that is, with a plurality of relatively elevated portions 10 and corresponding depressed portions 11 differing however from those on the spring caps in that they are the reverse and are displaced therefrom angularly through 45 degrees. Interposed between these cam plates are cam disks 14 having their top and bottom faces shaped the reverse respectively of the coöperating cam faces on the spring caps 9 and bolster plates 12. Interposed between each cam disk 14 and the spring cap are a plurality of conical steel rollers 15, and between the cam disk 14 and the bolster cam plate 12 are a corresponding series of conical steel rollers 16. The number of rollers in each set corresponds to the number of elevations and depressions on the cam faces, and in the construction shown each set comprises 4 rollers.

When the cam plate 14 is in neutral position, or as shown in Figs. 3 and 4 of the drawing, the cam rollers rest in the coöperating depressions in the cam faces and consequently the truck bolster and the car body sustained thereby is relatively in its lowermost position. If, now, the cam disk 14 is rotated it will cause its own cam faces to travel over the rollers 15 and 16, respectively, and will also cause these rollers to travel over the corresponding cam faces on the spring cap 9 and bolster cam plate 12, and the travel of these parts causes an elevation or lifting of the truck bolster and of the car body, as will be obvious.

Various means for rotating the cam disks 14 may be employed. As shown, each of the cam disks has connected thereto an arm 17, said arms extending inwardly toward the longitudinal center of the car, and lying below the truck bolster. Connected to the end of each arm 17 is a link 18, whose free end is pivotally connected to the lower end of a depending lever 19, whose upper end is fulcrumed at 20 to a bracket 21 secured to the truck bolster. The link 18 has a pin and hole connection with the end of arm 17, and preferably said arm is provided with a plurality of holes 22 for receiving the connecting pin so that the leverage can be varied, if desired.

The levers 19 near their lower ends are pivotally connected to jaws on connecting rods 23 provided with turn buckles 24 for adjusting their length, and having their opposite ends provided with jaws which are pivotally connected to equalizing lever 25. The equalizing lever 25 is pivotally connected at its center by link 26 to the shorter end of a lever 27 which is fulcrumed at 28 to a suitable bracket 29 secured to the bottom of the under frame, and whose longer arm is guided by bars 30 also secured to the under frame, and at its end has a pin and slot connection with the end of piston rod 31 of an auxiliary brake cylinder 32. The piston 33 of said cylinder normally lies in proximity to one head of said cylinder, and the same end of the cylinder is connected by pipe 34 to the brake cylinder 35 of the usual air brake equipment.

The air brake equipment may be of any standard form, either Westinghouse or New York air brake mechanism. The drawing shows the standard freight car air brake equipment comprising the brake cylinder 35, the auxiliary reservoir 36 connected directly thereto, the triple valve 37, pipe 38 connecting the triple valve with the train pipe 39, and the other necessary piping. The piston rod 40 of brake cylinder 35 operates on the usual floating lever 41, from which connections are made to the brake beams of both trucks of the car, as will be readily understood without further description.

With the present invention one or more auxiliary reservoirs are provided, the drawing showing two such reservoirs marked respectively 43 and 44. The triple valve 37 is connected by pipe 45 to the brake cylinder 35 and by another pipe 46 directly to the auxiliary reservoir 44. The connection to auxiliary reservoir 36 is made through branch pipe 47 and that to auxiliary reservoir 43 through branch pipe 48, said branch pipes 47 and 48 uniting in a single pipe 49 connected to a pipe 50 which is a branch from pipe 46, the connection between pipes 49 and 50 being through the special control valve 51, as hereinafter described.

The special control valve 51 comprises a suitable casing having one end enlarged to provide a chamber 52 in which works a piston 54 having a fluid tight fit in said chamber by means of leather cup packing. In the reduced portion of the casing is a smaller piston 56 which is normally pressed toward the large piston by spring 57 and which carries a typical slide valve 58, said valve controlling a port 59 in the side wall of the valve casing. This port 59 has connected thereto the branch pipe 50, while the branch pipe 49 is connected to a port 60 also formed in the side wall of the casing but in a different transverse plane from port 59. When the port 61 in the slide valve registers with the port 59 in the valve casing communication is opened between pipes 49 and 50, as will be apparent.

The valve chamber 53 communicates through port 63 with a pipe 64 whose opposite end is connected to a port 65 in the side wall of the auxiliary brake cylinder 32, so that when the piston 33 is driven out sufficiently far to uncover port 65, brake cylinder pressure passes through pipe 64 to valve chamber 53 and moves valve 54 so that its stem contacts with the stem of piston 56 and moves the latter against the tension of spring 57 to bring port 61 in slide valve 58 out of register with port 59 and break connection between the pipes 49 and 50.

When the triple valve is in brake release position the slide valve 58 is held by spring 57 so that port 61 registers with port 59 and consequently train pipe pressure which passes the triple valve piston through the usual feed groove passes to all of the three auxiliary reservoirs, passing directly to auxiliary reservoir 44 through pipe 46 and to auxiliary reservoirs 36 and 43 through branch pipe 50 by way of the control valve, thence through pipe 49, and thence through branch 47 to auxiliary reservoir 36 and through branch 48 to auxiliary reservoir 43. Consequently all three of the auxiliary reservoirs are charged to the same pressure as is carried by the train pipe. Upon reduction of train pipe pressure to apply the brakes the triple valve operates in the usual way to admit pressure from the auxiliary reservoirs to the brake cylinder, and such pressure flows to the brake cylinder equally from all three of the auxiliary reservoirs, the special control valve remaining in normal position for some time. Air naturally passes from the main brake cylinder 35 to the auxiliary cylinder 32, driving piston 33 outwardly and uncovering the relief port 65 in said cylinder, whereupon pressure passes through pipe 64 into the control valve behind the large piston 54, forcing this piston over to move the slide valve 61 to break connection between pipes 49 and 50, as heretofore described. Consequently, the admission of air from two of the auxiliary reservoirs to the brake cylinder ceases, while the pressure in auxiliary reservoir 44, which is connected directly to the triple valve, equalizes with the brake cylinder.

The pressure in auxiliary cylinder 32 is at all times equal to the pressure in the main brake cylinder 35. The outward travel of the piston 33 of the auxiliary cylinder through the lever arrangements and cam disks described has a tendency to lift the car body, and such lifting must actually be effected before the piston 33 moves over sufficiently to uncover relief port 65. Obviously the amount of pressure necessary to drive the piston 33 over sufficiently far to uncover this relief port will vary according to the load or weight of the car body. Consequently the special control valve will be actuated sooner when the car is light than when the car is heavy, so that the connection of all three auxiliary reservoirs with the main brake cylinder will remain intact for a longer period of time in the case of a heavily loaded car than in the case of a light car. As soon, however, as the pressure in the main brake cylinder and the auxiliary brake cylinder reaches such a degree as to lift the car body, whether light or heavily loaded, the piston 33 is moved over sufficiently to uncover the relief port 65 and admit brake cylinder pressure into the control valve, whereupon the connection between two of the auxiliary reservoirs and the brake cylinder is interrupted, so that thereafter only the one remaining auxiliary reservoir can equalize with the brake cylinder. The auxiliary reservoir 44 is alone connected directly to the triple valve, and since on all cars this one auxiliary reservoir equalizes with the brake cylinder, a uniform release of the brakes throughout the train is assured. When train pipe pressure is restored to move the triple valve to brake release position the pressure from the auxiliary cylinder 32 is released, and the weight of the car body forces piston 33 backwardly, whereupon relief pipe 64 vents into the cylinder 32 and around the piston rod of the same, thereby permitting spring 57 to move the small and also the large piston in the control valve back to normal position.

With the mechanism described, as in our prior patent heretofore identified, it is possible to obtain a high braking effect on heavy or loaded cars, with a lighter braking effect on light or unloaded cars, the braking effect in each case depending upon the weight of the car. Consequently a very uniform braking effect throughout the train is secured, giving full control over very long trains and also preventing skidding and flattening of the wheels, and at the same time uniformity of auxiliary reservoir pressure is secured throughout the train when the brakes are set, so that upon increase of train pipe pressure all of the triple valves go to release position substantially simultaneously. There is little loss of air due to the fact that the air vented from cylinder 32 goes to the special control valve, instead of directly to the atmosphere. The particular mechanism described for exerting the lifting action on the car body is such that there is minimum friction, thereby rendering the control mechanism more sensitive than with prior devices for effecting the same purpose.

What we claim is:

1. Load regulated fluid-pressure brake mechanism comprising a brake cylinder, a rotary member providing cam faces and rollers and arranged to exert a lifting action on the car, and means connected to said rotary member for regulating the brake cylinder pressure.

2. Load regulated fluid-pressure brake mechanism comprising a brake cylinder, cam plates interposed between the truck frame and the car body, rollers interposed between said cam plates, and mechanism for causing said rollers to travel on said cam faces and thereby exert a lifting action on the car body, said mechanism regulating the brake cylinder pressure.

3. Load regulated fluid-pressure brake mechanism comprising a brake cylinder, a cam disk, a coöperating cam plate, rollers between said cam disk and cam plate, and means for rotating said cam disk to exert a lifting action on the car body, said disk rotating means also serving to regulate the brake cylinder pressure.

4. Load regulated fluid-pressure brake mechanism comprising a brake cylinder, top and bottom cam plates, rotary disks between said plates, rollers carried by said disks and coöperating with the cam plates to lift the car body when the disks are rotated, and means for rotating said disks and also arranged to regulate the brake cylinder.

5. Load regulated fluid pressure brake mechanism comprising a brake cylinder, a relief vent therefrom, means controlled by the weight of the car and controlling said vent, a reservoir connected to the brake cylinder, and a control valve controlled by the pressure passing said relief vent and itself controlling the flow of air from said reservoir to the brake cylinder but without opening said reservoir to the atmosphere.

6. Load regulated fluid pressure brake mechanism comprising a brake cylinder, a reservoir connected to said brake cylinder, and means actuated by brake cylinder pressure and controlled by the weight of the car and regulating the equalization of reservoir pressure with brake cylinder pressure according to the weight of the car and without opening said reservoir to the atmosphere.

7. Load regulated fluid pressure brake mechanism comprising a brake cylinder, a reservoir connected to said brake cylinder, and means actuated by brake cylinder pressure and acting to lift the car body and arranged to effect the closing of communication from said reservoir to the brake cylinder without opening said reservoir to the atmosphere.

8. Load regulated fluid pressure brake mechanism comprising a brake cylinder, a reservoir connected to the brake cylinder, an auxiliary cylinder connected to the brake cylinder, a fluid pressure actuated valve controlling the flow of air from said reservoir to the brake cylinder without opening said reservoir to the atmosphere, and a piston in said auxiliary cylinder controlled by the weight of the car and itself controlling the flow of fluid pressure to said fluid pressure actuated valve.

9. Load regulated fluid pressure brake mechanism comprising a brake cylinder, a reservoir connected to said brake cylinder, an auxiliary cylinder connected to the brake cylinder, a piston in said auxiliary cylinder acting to lift the car-body, a relief port controlled by said auxiliary cylinder piston, and a control valve actuated by fluid passing said relief port and serving to regulate the flow of air to the brake cylinder without opening the reservoir to the atmosphere.

10. Load regulated fluid-pressure brake mechanism comprising a brake cylinder, a plurality of auxiliary reservoirs connected thereto, and means controlled by the load of the car and serving to control communication between one of said auxiliary reservoirs and the brake cylinder without opening the auxiliary reservoirs to the atmosphere.

11. Load regulated fluid-pressure brake mechanism comprising a brake cylinder, means actuated by brake cylinder pressure and acting to lift the car body, a plurality of auxiliary reservoirs, and means controlled by the car lifting mechanism and arranged to control communication from one of said auxiliary reservoirs to the brake cylinder without opening the auxiliary reservoirs to the atmosphere.

12. In fluid-pressure brake mechanism, the combination of a brake cylinder, a triple valve, a plurality of auxiliary reservoirs, and a control valve controlled by the weight of the car body and acting automatically to cut off communication between one of the auxiliary reservoirs and the brake cylinder upon a pre-determined pressure in the latter but without opening the auxiliary reservoirs to the atmosphere.

13. In fluid-pressure brake mechanism, the combination of a brake cylinder, a triple valve, a plurality of auxiliary reservoirs connected to the brake cylinder and triple valve, and a control valve acting automatically to cut off communication between one of said auxiliary reservoirs and the brake cylinder upon a predetermined pressure in the latter but without opening the auxiliary reservoirs to the atmosphere.

In testimony whereof, we have hereunto set our hands.

H. H. FORNEY.
O. B. SCHOENKY.

Witnesses:
Max Eichrodt,
F. R. Sellman.